United States Patent Office 2,712,770
Patented July 12, 1955

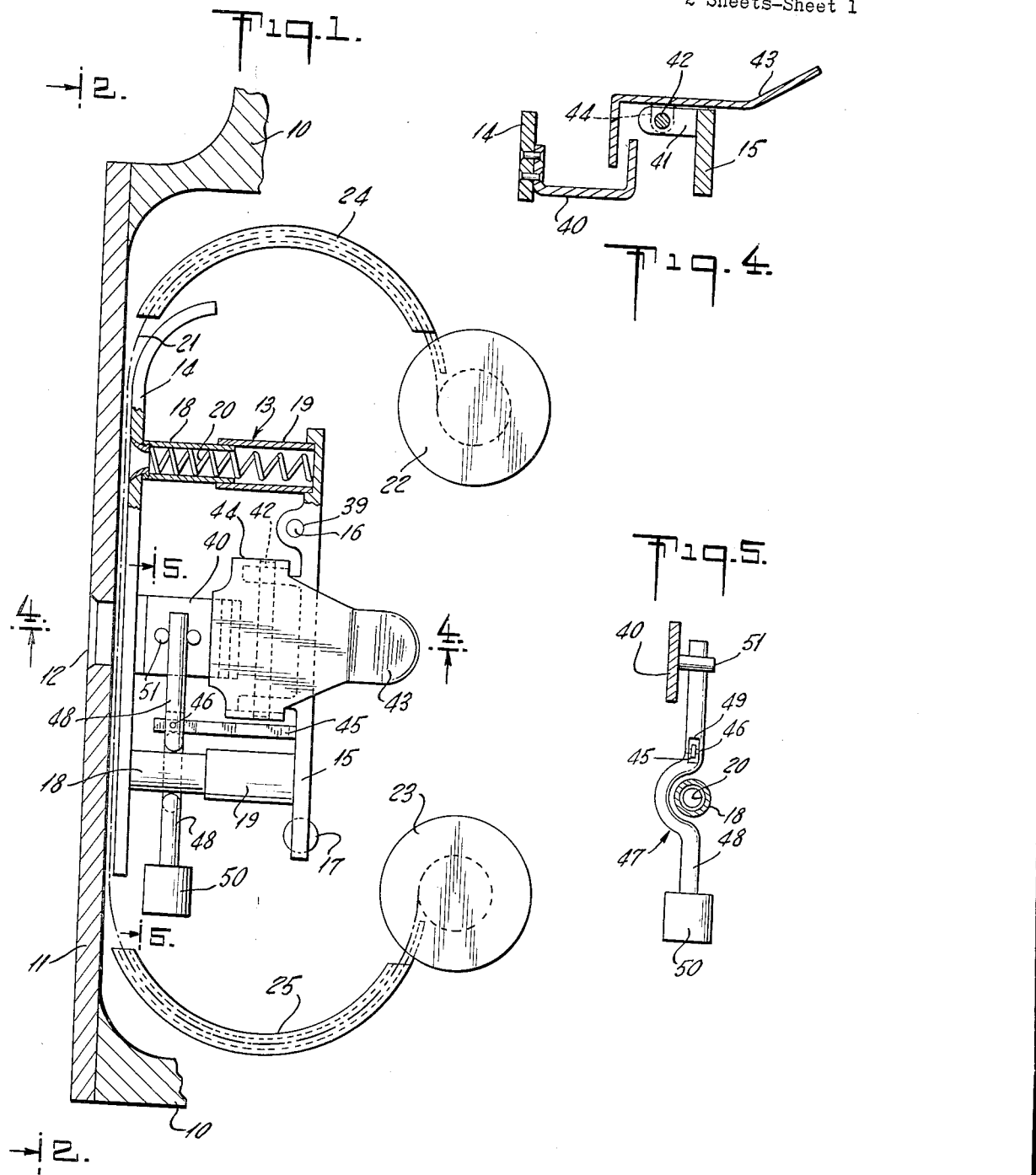

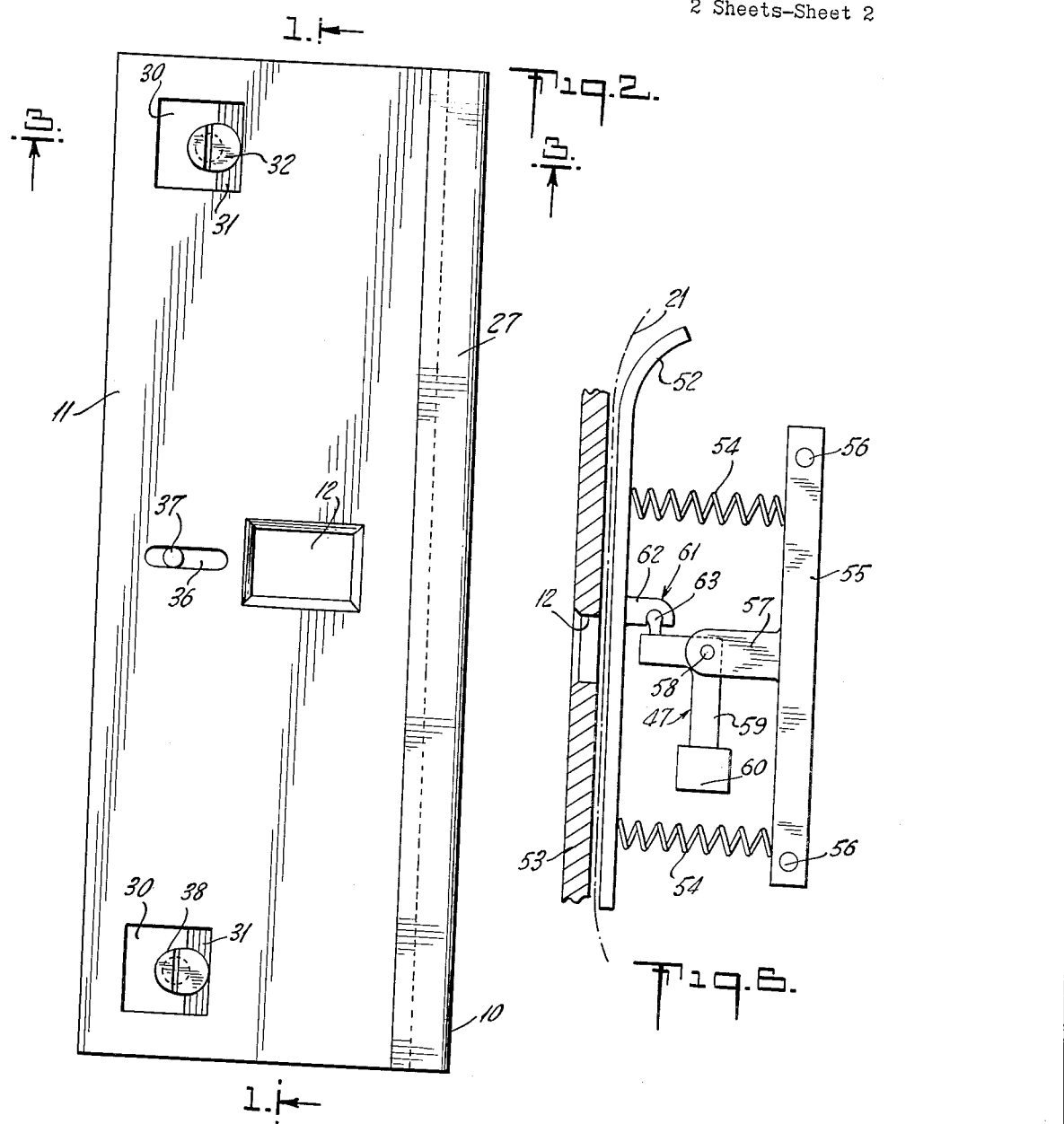
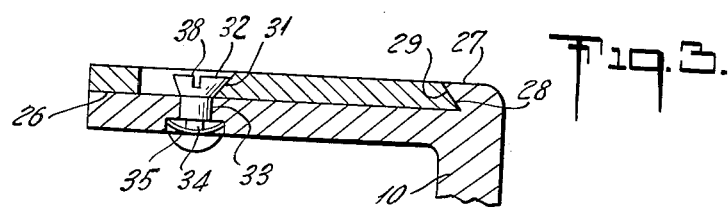

2,712,770
FILM GUIDING AND EXPOSURE ARRANGEMENT

Jacques Bolsey, Eli Elison, and Robert V. Nicolosi, New York, N. Y.; said Elison and said Nicolosi assignors to said Bolsey Application September 25, 1951, Serial No. 248,254

11 Claims. (Cl. 88—17)

The present invention relates to a film guiding and exposure arrangement such as a camera or magazine and more particularly to those parts of the camera or magazine associated with the movement of the film across the exposure aperture, such as the front plate of the camera or magazine and the pressure plate thereof.

One of the objects of the present invention is to provide a mounting for the front plate of a camera or magazine which permits the same to be easily and conveniently removed from and mounted on the camera body so that the exposure aperture and film track may be conveniently cleaned.

A further object of the present invention is to provide a mounting for the pressure plate of a camera or magazine which permits the same to be easily and conveniently removed for cleaning purposes and to give access to the film track.

A still further object of the present invention is to provide an arrangement for automatically maintaining constant the pressure with which the pressure plate is urged towards the front plate, irrespective of the movement of the camera or magazine.

With the above objects in view, the present invention mainly consists of a film guiding and exposure arrangement having a housing provided with a front face on which a front plate is mounted. This front plate has the exposure aperture formed therein and is held in position on the housing by the engagement of a side edge portion of the front plate with a groove in the housing. The front plate is removably held in position on the housing by rotatable eccentrically mounted wedge members which abut against the front plate. These wedge members may be turned away from the front plate so that the latter may be removed. The pressure plate of the camera or magazine forming the film guiding and exposure arrangement is urged toward the front plate thereof by a spring means connected to the pressure plate and to a support plate which forms part of the pressure plate assembly. This support plate is removably mounted on pins located within the housing, and a two-armed actuating member is pivotally mounted on the support plate to engage a U-shaped member fixed to the pressure plate when the actuating member is pivoted so as to retract the pressure plate from its operative position against the action of the spring means, toward the support plate so that the entire pressure plate assembly can be removed as a unit. This actuating member is eccentrically mounted for pivotal movement on a lug extending from the support plate so that when the actuating member is pivoted it becomes wedged against the lug to thereby hold the pressure plate in its retracted position against the action of the spring means.

An elongated pendulum bar is pivotally mounted intermediate its ends in the camera body on the support plate of the pressure plate assembly, and this pendulum bar has a weight at one end thereof and engages pressure plate at the other end thereof, so that when the device is subjected to accelerated or decelerated movement, the force tending to move the pressure plate towards or away from the front plate of the camera will be neutralized by the force tending to move the weight of the pendulum means, and in this way the pressure plate is urged with a constant pressure towards the front plate irrespective of the movement of the device.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 shows an elevational partially sectional and partially diagrammatic view of a portion of an arrangement constructed in accordance with the present invention, and is taken along line 1—1 of Fig. 2 in the direction of the arrows;

Fig. 2 is an elevational view of the front plate and front portion of the camera or magazine, taken along line 2—2 of Fig. 1 in the direction of the arrows;

Fig. 3 is a sectional view of a part of the structure illustrated in Fig. 2, taken along line 3—3 of Fig 2 in the direction of the arrows;

Fig. 4 is a partially sectional view of a part of the structure illustrated in Fig. 1, taken along line 4—4 of Fig. 1 in the direction of the arrows;

Fig. 5 is a partially sectional view of a part of the structure illustrated in Fig. 1, taken along line 5—5 of Fig. 1 in the direction of the arrows; and Fig. 6 is a diagrammatic view of a different embodiment of part of the structure shown in Fig. 1.

In the drawings there is shown only so much of a camera or magazine of the present invention as is necessary to afford a full understanding of the present invention. It is to be understood that conventional camera parts, such as a film transporting arrangement, a shutter, shutter moving means, etc., are all associated with the structure illustrated in the drawing.

The present invention is intended to provide easy access to the film track and to make it easy to clean the exposure aperture and pressure plate of the camera or magazine. Moreover, it sometimes happens, especially in aircraft, that a camera is moved in space and accelerates or decelerates so as to increase or decrease the pressure with which the pressure plate is urged toward the front plate. This latter effect gives rise to various difficulties, in that if the pressure plate is urged toward the front plate with too great a force it may prevent the movement of the film between the front plate and pressure plate and thereby cause jamming in the operation of the camera, or, on the other hand, if the pressure plate is not urged towards the front plate with sufficient force, the film may loosely float in the space between the front plate and pressure plate and move out of the focal plane of the camera so as to cause improper operation thereof.

The drawings illustrate possible constructions in accordance with the present invention for providing easy cleaning of the pressure plate and exposure aperture as well as access to the film track, and in addition, these constructions provide a means for maintaining constant the force with which the pressure plate is urged towards the front plate, irrespective of movements of the camera as when the same is mounted in a diving airplane, for example.

Referring now to the drawings, there is shown in Fig. 1 the housing 10 having the front plate 11 removably mounted thereon by a construction to be described below. This front plate 11 is formed with the exposure aperture 12.

Located within the housing is the pressure plate assembly 13, which includes the pressure plate 14 and the support plate 15. Fixedly mounted in the housing is the solid pin 16 and the slotted pin 17 which both together form a pin means for removably supporting the pressure plate assembly 13 within the housing. The pressure plate 14 is interconnected with the support plate 15 by the telescoped tubes 18 and 19 which are respectively connected to the pressure plate 14 and support plate 15, as shown in Fig. 1. Located within each pair of telescope tubes 18 and 19 is a coil spring 20 which urges the pressure plate 14 away from the support plate 15 with a predetermined pressure for properly guiding the film 21 in its movement between the pressure plate 14 and front plate 11 in the focal plane of the camera.

The film supply reel 22 and the film take-up reel 23 are diagrammatically illustrated in Fig. 1 together with the guide members 24 and 25 which guide the film in its movement from the supply reel 22 to the take-up reel 23. As was mentioned above, any conventional film transporting arrangement may be used to move the film in the direction of its length between the pressure plate 14 and front plate 11.

As is apparent from Figs. 2 and 3 of the drawings, the housing 10 is provided with a pair of adjacent surface portions 26 and 27 which are respectively located in parallel spaced planes that are adjacent to each other and are interconnected by the undercut, substantially V-shaped groove 28 formed in the camera body 10. The front plate 11 rests on the surface portion 26 and has an inclined side edge portion 29 which mates with and engages the V-shaped groove 28. The front plate 11, in addition to being formed with the exposure aperture 12, is formed with the pair of apertures 30, each of which has an inclined side face 31, which is inclined in a direction opposite to the inclined side edge portion 29 of the front plate 11. Located on the surface portion 26 of the housing 10 are a pair of wedge members 32 which are eccentrically and rotatably mounted by means of the studs 33 fixedly connected to the wedge members 32 and engaging openings formed in the camera body 10. These studs 33 are each formed with a groove 34 in which a spring member 35 is located to resiliently urge wedge member 32 against the surface portion 26 of the housing. These spring members 35, as is apparent from Fig. 3, are substantially dish-shaped and may be either split rings or substantially U-shaped rings so as to be capable of slipping into and out of the groove 34. The wedge members 32 have inclined side surfaces which, in the position shown in Figs. 2 and 3, engage the inclined face 31 of the apertures 30 to hold the plate 11 in operative position with the inclined side portion 29 thereof located in the groove 28. In order to insure the proper positioning of the front plate 11 on the housing 10, the front plate 11 is formed with the elongated slot 36 in which a stud 37, fixedly mounted on the housing, is located. When it is desired to remove the plate 11, so as to permit easy cleaning of the exposure aperture 12 or to give access to the film track, the wedge members 32 are rotated through 90°, for example, by any suitable means, such as by engaging grooves 38 therein with a coin, so that no special tools are needed. The apertures 30 are substantially larger than the wedge members 32 so that the front plate 11 can be easily removed when the wedge members 32 are moved out of the position illustrated in Figs. 2 and 3. Thus, a very simple structure is provided for rapidly and easily mounting and dismounting the front plate 11.

As is apparent from Fig. 1, the support plate 15 of the pressure plate assembly 14 is formed with an aperture 39 extending along the width thereof and embracing the pin 16 which is fixedly mounted in the camera body. A portion of the support plate 15, which is distant from the aperture 39, is located within the slot of the slotted pin 17, and it is apparent that while this structure maintains the pressure plate assembly 13 in proper position in the camera, this pressure plate assembly 13 may easily be removed by retracting the pressure plate 14 from its operative position illustrated in Fig. 1 and lifting the entire pressure plate assembly off from the pin means formed by elements 16 and 17.

To enable this latter result to be produced, the pressure plate 14 has fixedly connected thereto, as shown in Fig. 4, the U-shaped member 40. This member may be mounted on the pressure plate 14 by any suitable means, such as rivets or the like. The support plate 15 is provided with a pair of lugs 41 which support the pivot pin 42. A two-armed actuating member 43 is provided with a pair of lugs 44 which are rotatably mounted on the pivot pin 42 so as to pivotally support the actuating member 43. As is apparent from Fig. 4, the pin 42 is located at a further distance from the left end of lug 41, as viewed in Fig. 4, than from the sides thereof so that when the actuating member 43 is turned in a counterclockwise direction, as viewed in Fig. 4, the under-surface thereof becomes wedged against the left end portion of the lugs 41. As is apparent from Fig. 4, one of the arms of the actuating member 43 is located within the U-shaped member 40 and adjacent to that leg thereof which is nearest to the support plate 15, so that when the actuating member 43 is turned in a counterclockwise direction, as viewed in Fig. 4, the U-shaped member 40 and therewith the pressure plate 14 therewith will be moved toward the support plate 15 against the action of the springs 20, the tubes 18 entering into the tubes 19. The wedging of the actuating member 43 against the lugs 41 serves to maintain the pressure plate 14 in its retracted, inoperative position against the action of springs 20, and in this position of the parts, the horizontally extending arm of actuating member 43, as viewed in Fig. 4, is in a substantially upright position, so that this arm of the actuating member 43 may be grasped and raised to lift the entire pressure plate assembly from the pins 16 and 17 and out of the camera. The pressure plate assembly is put into the camera or magazine housing by the reverse of the above operations, as is obvious. The actuating member 43 may be conveniently moved by grasping the horizontally extending arm thereof, as viewed in Fig. 4, and turning the same. This latter construction provides a simple and convenient means for removing and replacing the pressure plate assembly from and into the housing in a single operation, so that the pressure plate 14 may be cleaned and so as to provide access to the film track.

As is shown in Fig. 1, an elongated bar member 45 of a rectangular cross-section is fixedly connected at the right hand end thereof to the support plate 15. This bar member 45 may be bent at its right hand end, as viewed in Fig. 1, to provide a flange which may be fixedly joined to the pressure plate 15 by any suitable means, such as riveting, welding, or the like. Adjacent the left hand end of the bar member 45, there is located a pivot pin 46 which is fixedly mounted in an aperture of the bar member 45, as by a press fit, for example. A pendulum means 47 which comprises an elongated bar member 48 is supported on this bar member 45. The elongated member 48 is provided with a rectangular slot 49 substantially larger than the cross-sectional area of the bar 45 and located about the same. The pin 46, at the ends thereof, pivotally supports the pendulum bar 48 and is located in apertures of the pendulum bar 48 which permit the latter to rotate about pin 46. A weight 50 is fixedly connected to one end of the pendulum bar 48 by any suitable means, such as by being threadedly connected thereto. The opposite end portion of the pendulum bar 48 is located between two spaced pin members 51, which are fixedly mounted in any suitable manner, such as by welding, for example, on the U-shaped member 40 and between the two side legs thereof. The pin members 51 are located apart from each other by a distance which is slightly greater than the width of the pendulum bar member 48. As is apparent from Figs. 1 and 5, pendulum bar 48 is suitably bent to clear the lower tube 18, as viewed in Fig. 1, and to permit movement of the pendulum bar 48 within desired limits without obstruction by the tube 18. The operation of the above described structure is as follows:

Referring to Fig. 1, and assuming that the camera is accelerated in a movement to the left, as when the camera is mounted in a moving airplane or automobile, for example, the inertia of the pressure plate 14 produced by this accelerating movement will tend to compress the springs 20 and cause the film to loosely float in the enlarged space formed by the movement of pressure plate 14 away from front plate 11. This will cause the film to move out of the focal plane and produce faulty pictures. By the above-described structure, when the camera is accelerated to the left, the weight 50 tends to move to the right due to its inertia, and this will tend to cause a movement of the upper end portion of pendulum bar 48 to the left, as viewed in Fig. 1. By properly designing the size of bar 48 and weight 50, it is possible to counterbalance the weight of the pressure plate 14 so that only the pressure of springs 20 act on the film 21, even though the camera should accelerate to the left, as viewed in Fig. 1, so that the film 21 is properly guided, irrespective of this movement of the camera.

It is evident that the opposite of the above operations take place when the camera is accelerated to the right, as viewed in Fig. 1. Such movement would tend to provide an increased pressure on the film 21 which might prevent movement of the same, but this latter result is prevented by the pendulum means which urges the pressure plate to the right, as viewed in Fig. 1 when the camera is accelerated to the right, as viewed in Fig. 1.

Accelerated or decelerated movements of the camera vertically, as viewed in Fig. 1, present no particular problem.

The above-described device is obviously equally effective to prevent undesired forces acting on pressure plate 14 when the camera is decelerated to the left or right, as viewed in Fig. 1, these latter movements respectively tending to cause undesired movement of the pressure plate toward and away from the front plate 11. It is evident that when the pressure plate assembly is removed from the camera or magazine housing, as described above, the pendulum means 47 will be removed therewith.

A different embodiment of a pendulum means 47' is illustrated in Fig. 6 where the pressure plate 52 is diagrammatically shown as being urged toward the front plate 53 by the springs 54 interconnecting the pressure plate 52 and support plate 55 which may be formed with apertures in which pins 56 are located so as to removably support the pressure plate assembly in the housing. The springs 54 may be located within or about any suitable stud means, such as telescoped tubes 18 and 19 described above. Lugs 57 extend from and are fixedly connected to support plate 55, and these lugs 57 serve to mount the pivot pin 58 which extends through an aperture in the angular arm 59 of the pendulum means 47 so as to pivotally support the same. A weight 16 is connected to the lower end of arm 59, as viewed in Fig. 6, by any suitable means such as threading or the like, and the arm 59 is connected to the pressure plate 52 by ball and socket joint 61 which, in the particular example illustrated in Fig. 6, includes the socket 62 fixedly connected to the pressure plate 52 and the ball 63 fixedly connected to the upper end of arm 59 of the pendulum means 47.

The operation of the construction illustrated in Fig. 6 obviously is identical to that described in connection with the structure illustrated in Fig. 5.

It will be understood that each of the elements described above, or two or more together, may also find a useful application in other types of constructions differing from the types described above.

While the invention has been illustrated and described as embodied in camera or magazine constructions having a removable front plate, a removable plate assembly, and a means for maintaining constant the pressure with which the pressure plate is urged towards the front plate, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A film guiding and exposure arrangement, comprising in combination, a housing; a stationary film gate member formed with an exposure aperture and being mounted on said housing; a pressure plate assembly located within said housing adjacent said front plate and comprising a pressure plate and spring means operatively connected to and urging said pressure plate toward said film gate member; and compensating means operatively connected to said pressure plate to compensate for the inertia of said pressure plate caused by acceleration or deceleration of said housing during movement thereof so that the pressure plate is urged by said spring means toward said front plate with a constant force irrespective of the movement of said housing.

2. A film guiding and exposure arrangement, comprising in combination, a housing having a front face and being formed with a substantially V-shaped undercut groove extending along said front face thereof; a front plate formed with an exposure aperture and being removably mounted on said front face of said housing to facilitate the cleaning of said exposure aperture and the film track in the camera, said front plate having an inclined side edge portion mating with and located in said V-shaped undercut groove; releasable mounting means operatively connected to said front plate for removably holding the same with said inclined side edge portion thereof located in said groove so that said front plate may be removed from said housing; a pressure plate assembly located within said housing adjacent said front plate and comprising a pressure plate and spring means operatively connected to and urging said pressure plate toward said front plate, said pressure plate assembly being removably mounted in said housing to facilitate the removal thereof for cleaning said pressure plate and providing access to the film track; and compensating means operatively connected to said pressure plate to compensate for the inertia of said pressure plate caused by acceleration or deceleration of said housing during movement thereof so that the pressure plate is urged by said spring means toward said front plate with a constant force irrespective of the movement of said housing.

3. A film guiding and exposure arrangement, comprising in combination, a housing having a front face; a front plate formed with an exposure aperture and being removably mounted on said front face of said housing to facilitate the cleaning of said exposure aperture and the film track; a pressure plate assembly located within said housing adjacent said front plate and comprising a pressure plate, a support plate spaced from said pressure plate and spring means operatively connected to said pressure plate and support plate and urging said pressure plate toward said front plate; pin means removably mounting said support plate in said housing so as to permit removal of said pressure plate assembly; and compensating means operatively connected to said pressure plate to compensate for the inertia of said pressure plate caused by acceleration or deceleration of said housing during movement thereof so that the pressure plate is urged by said spring means toward said front plate with a constant force irrespective of the movement of said housing.

4. A film guiding and exposure arrangement, comprising in combination, a housing having a front face; a front plate formed with an exposure aperture and being removably mounted on said front face of said housing to facilitate the cleaning of said exposure aperture and the film track in the camera; a pressure plate assembly located within said housing adjacent said front plate and comprising a pressure plate, a support plate spaced from said pressure plate and being formed with an aperture extending therethrough along the width thereof and spring means operatively connected to said pressure plate and support plate and urging said pressure plate toward said front plate; pin means removably mounting said support plate in said housing so as to permit removal of said pressure plate assembly, said pin means comprising a first pin member located within said aperture of said support plate and a second pin member formed with a slot extending along the length thereof and having a portion of said support plate located therein; and compensating means operatively connected to said pressure plate to compensate for the inertia of said pressure plate caused by acceleration or deceleration of said housing during movement thereof so that the pressure plate is urged by said spring means toward said front plate with a constant force irrespective of the movement of said housing.

5. A film guiding and exposure arrangement, comprising in combination, a housing having a front face; a front plate formed with an exposure aperture and being removably mounted on said front face of said housing to facilitate the cleaning of said exposure aperture and the film track; a pressure plate assembly located within said housing adjacent said front plate and comprising a pressure plate, a support plate spaced from said pressure plate, a U-shaped member having a pair of opposite legs and being connected at one of the legs thereof to said pressure plate on the side of said pressure plate located adjacent to said support plate, an actuating member pivotally mounted on said support plate and having an end portion thereof located within said U-shaped member and spring means operatively connected to said pressure plate and support plate and urging said pressure plate toward said front plate, whereby, when said actuating member is pivoted in one direction said pressure plate is released to the action of said spring means and, when said actuating member is pivoted in a direction opposite to said one direction, said actuating member engages said U-shaped member to move said pressure plate against the action of said spring means toward said support plate and away from said front plate; pin means removably mounting said support plate in said housing so as to permit removal of said pressure plate assembly; and compensating means operatively connected to said pressure plate to compensate for the inertia of said pressure plate caused by acceleration or deceleration of said housing during movement thereof so that the pressure plate is urged by said spring means toward said front plate with a constant force irrespective of the movement of said housing.

6. A film guiding and exposure arrangement, comprising in combination, a housing having a front face; a front plate formed with an exposure aperture and being removably mounted on said front face of said housing to facilitate the cleaning of said exposure aperture and the film track; a pressure plate assembly located within said housing adjacent said front plate and comprising a pressure plate, a support plate spaced from said pressure plate, a U-shaped member having a pair of opposite legs and being connected at one of the legs thereof to said pressure plate on the side of said pressure plate located adjacent to said support plate, an actuating member pivotally mounted on and eccentrically located in a lug of said support plate and having an end portion thereof located within said U-shaped member and spring means operatively connected to said pressure plate and support plate and urging said pressure plate toward said front plate, whereby, when said actuating member is pivoted in one direction said pressure plate is released to the action of said spring means and, when said actuating member is pivoted in a direction opposite to said one direction, said actuating member engages said U-shaped member to move said pressure plate against the action of said spring means toward said support plate and away from said front plate; pin means removably mounting said support plate in said housing so as to permit removal of said pressure plate assembly, said actuating member being wedged against said lug, due to the eccentric mounting of said actuating member therein, when said actuating member is pivoted in said opposite direction, whereby said pressure plate is maintained in its retracted position against the action of said spring means to permit removal of the pressure plate assembly from said pin means; and compensating means operatively connected to said pressure plate to compensate for the inertia of said pressure plate caused by acceleration or deceleration of said housing during movement thereof so that the pressure plate is urged by said spring means toward said front plate with a constant force irrespective of the movement of said housing.

7. A film guiding and exposure arrangement, comprising in combination, a housing having a front face; a front plate formed with an exposure aperture and being removably mounted on said front face of said housing to facilitate the cleaning of said exposure aperture and the film track; a pressure plate assembly located within said housing adjacent said front plate and comprising a pressure plate and spring means operatively connected to and urging said pressure plate toward said front plate, said pressure plate assembly being removably mounted in said housing to facilitate the removal thereof for cleaning said pressure plate and providing access to the film track; and compensating means operatively connected to said pressure plate to compensate for the inertia of said pressure plate caused by acceleration or deceleration of said housing during movement thereof so that the pressure plate is urged by said spring means toward said front plate with a constant force irrespective of the movement of said housing, said compensating means comprising an elongated pendulum member pivotally mounted intermediate its ends for free swinging movement and having a weight at one end thereof and engaging at the other end thereof said pressure plate, whereby, when the movement of said housing causes said weight to swing in one direction said pendulum engages said pressure plate and urges the same in a direction opposite to said one direction.

8. A film guiding and supporting arrangement, comprising in combination, a housing having a front face; a front plate formed with an exposure aperture and being removably mounted on said front face of said housing to facilitate the cleaning of said exposure aperture and the film track; a pressure plate assembly located within said housing adjacent said front plate and comprising a pressure plate and spring means operatively connected to and urging said pressure plate toward said front plate, said pressure plate assembly being removably mounted to facilitate the removal thereof for cleaning said pressure plate and providing access to the film track; and compensating means operatively connected to said pressure plate to compensate for the inertia of said pressure plate caused by acceleration or deceleration of said housing during movement thereof so that the pressure plate is urged by said spring means toward said front plate with a constant force irrespective of the movement of said housing, said compensating means comprising an elongated pendulum member pivotally mounted intermediate its ends and having a weight at one end thereof and being connected at the other end thereof to said pressure plate by a ball and socket joint, whereby, when the movement of said housing causes said weight to swing in one direction said pendulum engages said pressure plate and urges the same in a direction opposite to said one direction.

9. A film guiding and exposure arrangement, comprising in combination, a housing having a front face; a front plate formed with an exposure aperture and being removably mounted on said front face of said housing to facilitate the cleaning of said exposure aperture and the film track; a pressure plate assembly located within said housing adjacent said front plate and comprising a pressure plate, a support plate spaced from said pressure plate, a U-shaped member having a pair of opposite legs and a pair of spaced studs mounted thereon and being connected at one of the legs thereof to said pressure plate on the side of said pressure plate located adjacent to said support plate, an actuating member pivotally mounted on said support plate and having an end portion thereof located within said U-shaped member and spring means operatively connected to said pressure plate and support plate and urging said pressure plate toward said front plate, whereby, when said actuating member is pivoted in one direction, said pressure plate is released to the action of said spring means and, when said actuating member is pivoted in a direction opposite to said one direction, said actuating member engages said U-shaped member to move said pressure plate against the action of said spring means toward said support plate and away from said front plate; pin means removably mounting said support plate in said housing so as to permit removal of said pressure plate assembly; and compensating means operatively connected to said pressure plate to compensate for the inertia of said pressure plate caused by acceleration or deceleration of said housing during movement thereof so that the pressure plate is urged by said spring means toward said front plate with a constant force irrespective of the movement of said housing, said compensating means comprising an elongated pendulum supported on said support plate and being pivotally mounted intermediate its ends, said pendulum having a weight at one end portion thereof and being located between said pair of spaced studs adjacent the other end portion thereof, whereby when the movement of said housing causes said weight to move in one direction, said other end portion of said pendulum engages one of said studs to urge said pressure plate in a direction opposite to said one direction.

10. A film guiding and exposure arrangement, comprising in combination, a housing; a film gate member mounted on said housing; a pressure plate located within said housing adjacent to said film gate member; spring means operatively connected to said pressure plate and urging the same towards said film gate member; an elongated pendulum member pivotally mounted between the ends thereof within said housing for free swinging movement and being located adjacent to said pressure plate, said pendulum member having a weight located on one end thereof and engaging at the opposite end thereof said pressure plate, whereby, when the acceleration or deceleration of movement of said housing tends to increase or decrease the pressure with which said pressure plate is urged towards said film gate member by said spring means, said pendulum member urges said pressure plate in a direction opposite to that in which it is urged by the movement of said housing so as to maintain the pressure urging said pressure plate toward said front plate constant.

11. A film guiding and exposure arrangement, comprising in combination, a housing; a front plate mounted on said housing; a pressure plate located within said housing adjacent to said front plate; spring means operatively connected to said pressure plate and urging the same towards said front plate; an elongated pendulum member pivotally mounted between the ends thereof within said housing and being located adjacent to said pressure plate, said pendulum member having a weight located on one end thereof and being connected at the opposite end thereof to said pressure plate by a ball and socket joint, whereby, when the acceleration or deceleration of movement of said housing tends to increase or decrease the pressure with which said pressure plate is urged towards said front plate by said spring means, said pendulum member urges said pressure plate in a direction opposite to that in which it is urged by the movement of said housing so as to maintain the pressure urging said pressure plate toward said front plate constant.

References Cited in the file of this patent

UNITED STATES PATENTS

| Number | Name | Date |
|---|---|---|
| 1,318,966 | Clardy | Oct. 14, 1919 |
| 1,350,548 | Darby | Aug. 24, 1920 |
| 1,357,983 | Hunt | Nov. 9, 1920 |
| 1,692,092 | Oehmichen | Nov. 20, 1928 |
| 1,897,477 | Holman | Feb. 14, 1933 |
| 1,913,380 | Frappier et al. | June 13, 1933 |
| 2,036,894 | Sweet | Apr. 7, 1936 |
| 2,111,741 | Runge | Mar. 22, 1938 |
| 2,191,036 | Seymour | Feb. 20, 1940 |
| 2,492,418 | Furer | Dec. 27, 1949 |
| 2,493,440 | Brenkert | Jan. 3, 1950 |